M. FOGDE AND L. P. SOUTHWICK.

STAMPING MACHINE.

APPLICATION FILED MAY 23, 1919.

Reissued Dec. 27, 1921. 15,254.

6 SHEETS—SHEET 1.

INVENTOR
Mathias Fogde and
Lawrence P. Southwick
BY
Meyer, Cushman & Rea
ATTORNEYS M. FOGDE AND L. P. SOUTHWICK.
STAMPING MACHINE.
APPLICATION FILED MAY 23, 1919.
Reissued Dec. 27, 1921. 15,254.
6 SHEETS—SHEET 2.
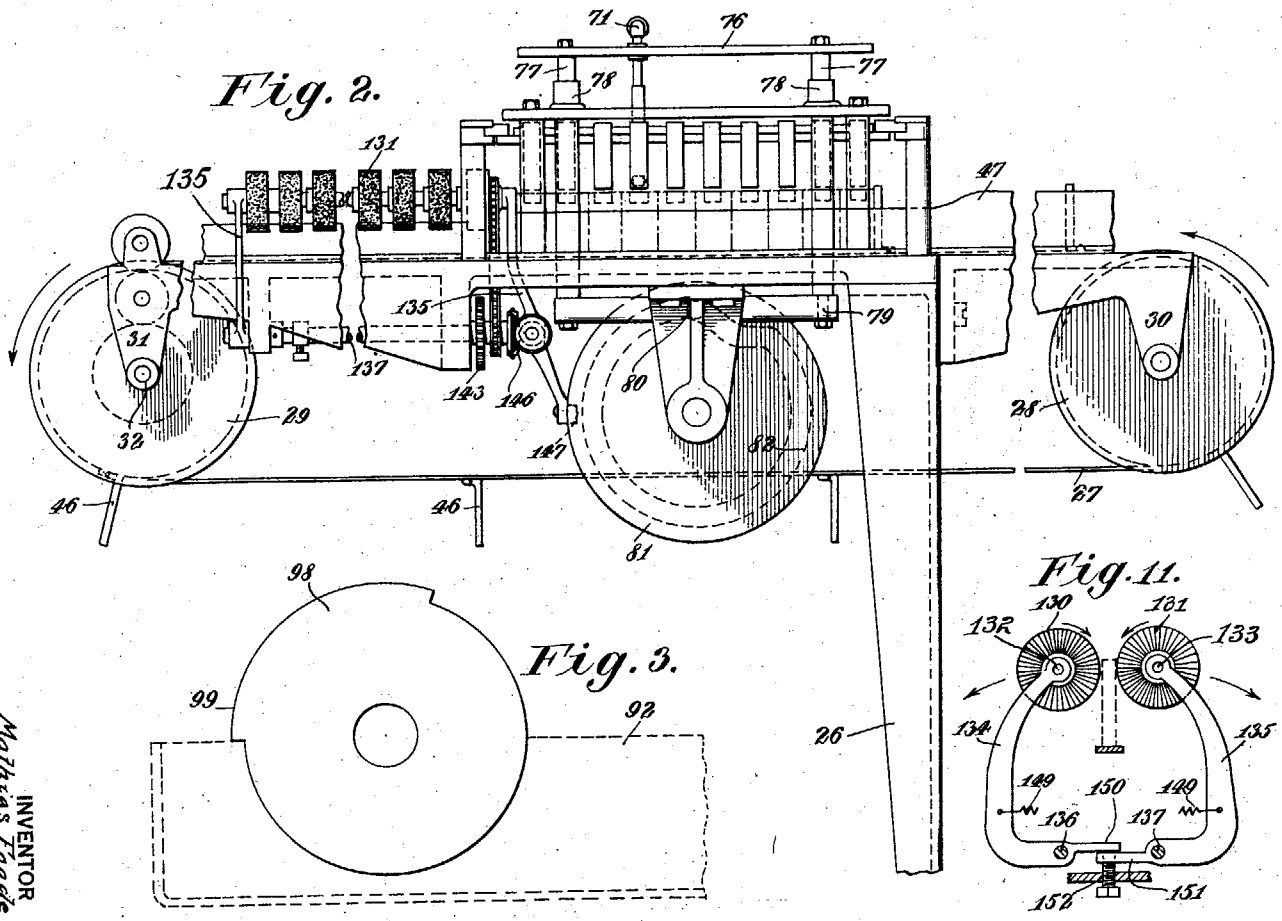
INVENTOR
Mathias Fogde and
Lawrence P. Southwick
BY
Meyer, Berthman & Rea
ATTORNEYS M. FOGDE AND L. P. SOUTHWICK.
STAMPING MACHINE.
APPLICATION FILED MAY 23, 1919.
Reissued Dec. 27, 1921.
15,254.
6 SHEETS—SHEET 3.
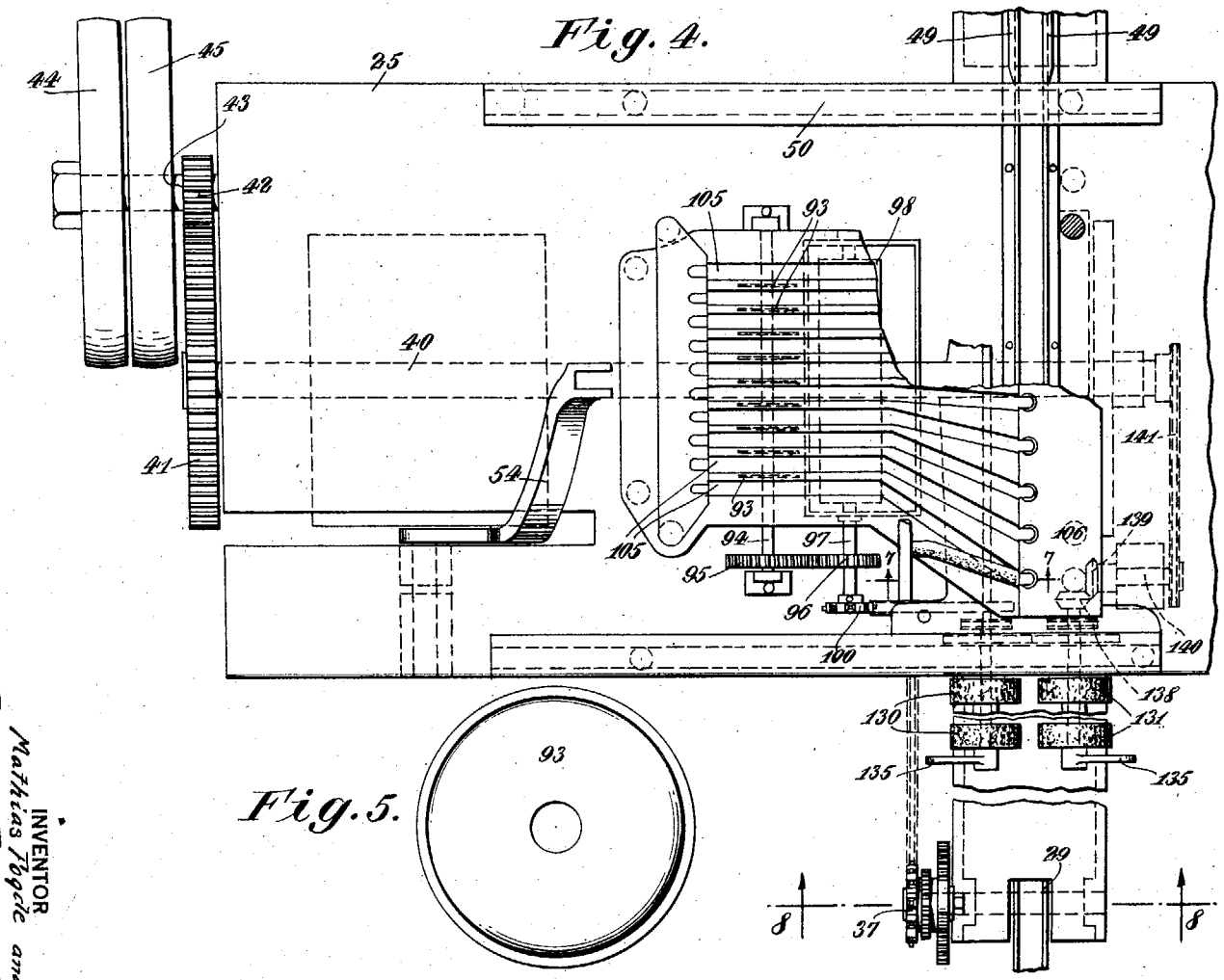
INVENTOR
Mathias Fogde and
Lawrence P. Southwick
BY
Meyer, Lauchman & Rea
ATTORNEYS

M. FOGDE AND L. P. SOUTHWICK.

STAMPING MACHINE.

APPLICATION FILED MAY 23, 1919.

Reissued Dec. 27, 1921. 15,254.

6 SHEETS—SHEET 4.

INVENTOR
Mathias Fogde, and
Lawrence P. Southwick
BY
Meyers, Cushman & Rea
ATTORNEYS M. FOGDE AND L. P. SOUTHWICK.
STAMPING MACHINE.
APPLICATION FILED MAY 23, 1919.
Reissued Dec. 27, 1921.
15,254.
6 SHEETS—SHEET 5.
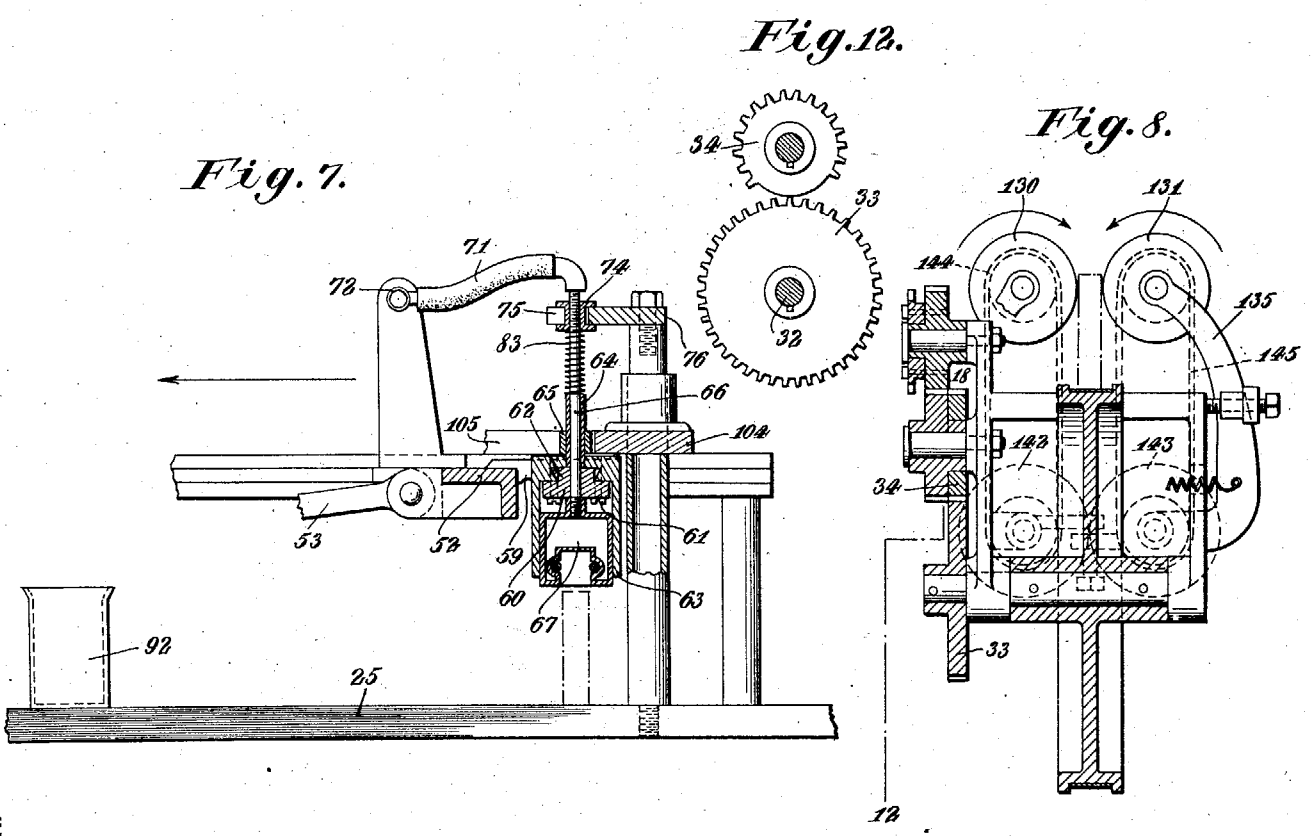
INVENTOR
Mathias Fogde and
Lawrence P. Southwick
BY
Meyers, Cushman & Rea
ATTORNEYS

M. FOGDE AND L. P. SOUTHWICK.

STAMPING MACHINE.

APPLICATION FILED MAY 23, 1919.

Reissued Dec. 27, 1921. 15,254.

6 SHEETS—SHEET 6.

INVENTOR
Mathias Fogde and
Lawrence P. Southwick
BY
Meyer, Lenschman & Rea
ATTORNEYS

UNITED STATES PATENT OFFICE.

MATHIAS FOGDE AND LAWRENCE P. SOUTHWICK, OF RICHMOND, VIRGINIA, ASSIGNORS, BY MESNE ASSIGNMENTS, TO STOKES & SMITH COMPANY, OF PHILADELPHIA, PENNSYLVANIA, A CORPORATION OF PENNSYLVANIA.

STAMPING-MACHINE.

15,254. Specification of Reissued Letters Patent. Reissued Dec. 27, 1921.

Original No. 1,244,438, dated October 23, 1917, Serial No. 62,323, filed November 19, 1915. Application for reissue filed May 23, 1919. Serial No. 299,336.

*To all whom it may concern:*

Be it known that we, MATHIAS FOGDE and LAWRENCE P. SOUTHWICK, a subject of the Czar of Russia, and a citizen of the United States, respectively, and residents of Richmond, in the county of Henrico and State of Virginia, have invented a certain new and useful Improvement in Stamping-Machines, of which the following is a specification.

Our present invention relates generally to stamping machines, and more particularly to machines for applying revenue stamps to cigarette boxes, our primary object being to provide a simple and inexpensive apparatus which will obviate the difficulties and disadvantages of machines of this type now in use and which will, for these reasons, operate with increased effectiveness and promote uniformly better results.

A more specific object of our invention is to provide a stamp applying apparatus of such nature as to preclude gumming of the movable operating parts from the liquid adhesive applied to the stamps, and to utilize brushes in connection therewith, gumming of which will be unimportant, for setting the applied stamps firmly and evenly on the boxes.

A further object of our invention is to provide means for withdrawing a single strip of stamps at a time from a box containing a series of such strips in superposed relation.

Other objects and the resulting advantages will clearly appear in the course of the following description, from which our invention will be better understood by reference to the accompanying drawings, forming a part of this specification, and in which—

Fig. 2 is a front elevation thereof.

Fig. 3 is an end elevation of the adhesive applying roller.

Fig. 4 is a plan view, parts being broken away.

Fig. 5 is a side view of one of the stamp cutting knives.

Fig. 7 is a detail vertical longitudinal section taken substantially on line 7—7 of Fig. 4.

Fig. 8 is a similar view taken substantially on line 8—8 of Fig. 4.

Fig. 11 is a detail section showing an opposing pair of brushes and their supporting arms.

Fig. 12 is a detail vertical section, taken substantantially on line 12—12 of Fig. 8.

Fig. 14 is an enlarged view of a portion of Fig. 6, to be hereinafter referred to.

Figures 1, 15:
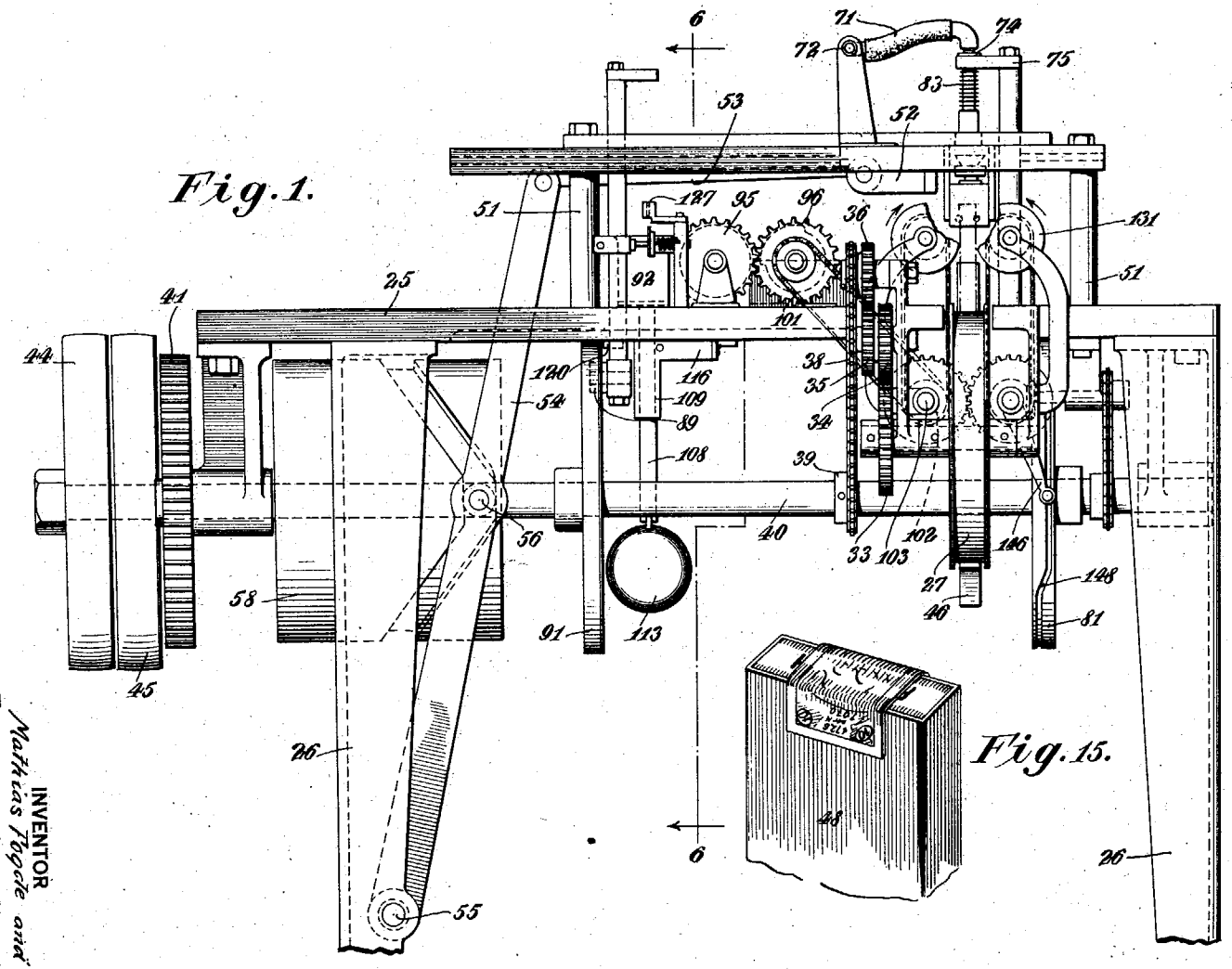
Figure 1 is a side elevation of our improved apparatus.
Fig. 15 is a perspective view of a cigarette box with its revenue stamp applied as by means of our invention.

Referring now to these figures, and particularly to Figs. 1 and 2, cigarette boxes are stamped upon a horizontal table 25, supported in elevated position upon legs 26, and transversely across one end of which, corresponding to the front of the apparatus, is the upper run of an endless, steel belt 27, which belt travels around grooved pulleys 28 and 29 mounted in brackets 30 and 31 depending from the sides of the table 25, the shaft 32 of pulley 29 having secured thereon, as shown in Fig. 1, a gear wheel 33 in geared connection, through gears 34, 35 and 36, with a shaft to which is secured a sprocket wheel 37, see Fig. 4, connected by a sprocket chain 38 with a sprocket wheel 39, secured upon the main driven shaft 40 journaled longitudinally of and below table 25.

One of gears of the chain of gears just mentioned, namely gear 34, is in the nature of a mutilated gear, as plainly seen by reference to Figs. 4 and 12, so as to communicate intermittent travel to the steel belt 27 from the continuously rotating driven shaft 40, the latter of which is provided upon one end with a large gear 41 in mesh with a small gear 42, the shaft 43 of which is provided with fast and loose pulleys 44 and 45 for the reception of a power transmission belt from a suitable source of power, not shown.

The belt 27, as best seen in Fig. 2, is provided with equi-distantly spaced and outstanding brackets 46 in advance of each of which the cigarette boxes are arranged in series of ten each at the right-hand side of the table. In its passage across the table, the belt 27 passes between parallel upright guide shift 47 spaced apart a distance slightly greater than the width of the cigarette box 48, shown in Fig. 15, and the upper portions of which guide strips 47 are flared away from one another as at 49, in Fig. 4, at the right-hand side of table 25 and at which point each series of boxes is introduced between the guide shifts and upon the belt 27 at a time when the latter is stationary, the preceding series being at this time in stamp receiving position.

Mounted above the table 25 and along the opposite sides thereof in parallel relation are a pair of grooved guide members 50, supported upon uprights 51, and receiving the opposite ends of a cross head 52, as most plainly seen in Fig. 7, which is slidable forwardly and rearwardly in a horizontal plane above the surface of table 25, through connections including a connecting rod 53 extending thereto from the upper end of a lever 54, as seen in Fig. 1, the lower end of which lever is fulcrumed upon one of the legs 26, as at 55, and the intermediate portion of which supports a roller 56 engaged and traveling within the cam track 57 of a cam roller 58 secured upon the driven shaft 40. The sliding cross head 52, as shown in Fig. 7, is connected by means of lugs 59 to a cross strip 60, by means of fastening members such as screws indicated at 61, the cross strip 60 being thus slidable forwardly and rearwardly with the cross head 52. The cross strip 60 is provided with a longitudinal, central vertical slot and has an upper dove-tailed extension 62 projecting longitudinally for its entire length. Upon the cross strip 60 are disposed a series of rectangular casings 63, ten in number, slidably engaging the dove-tailed extension 62 of cross strip 60 and thus slidable longitudinally on this strip in a direction transverse to the machine as a whole, these several casings 63 being entirely independent of one another, and each having an upright tube 64 provided with a roller 65 and receiving therethrough a vertical pipe 66 which projects through the slot in the cross strip 60 and is, at its lower end, threaded into a stamp applying member 67, the latter being in the form of a hollow body, the interior of which is in communication with the lower end of the respective pipe 66 each of the casings 63 having a lower open end through which its particular stamp applying member may move in its vertical reciprocating movement within the casing, as hereinafter described.

Figure 10:
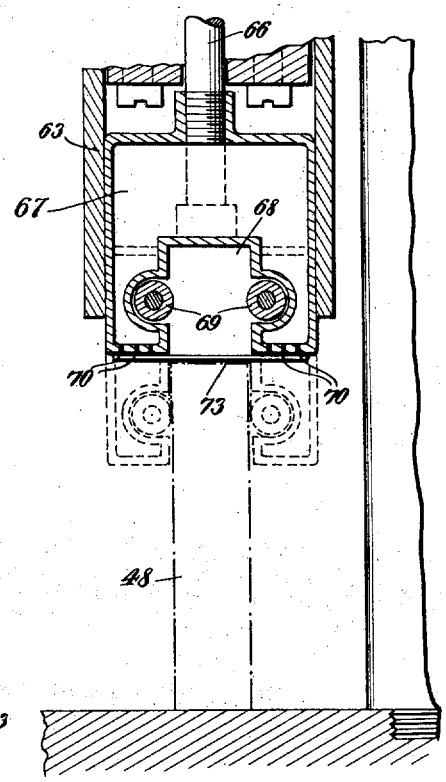
Fig. 10 is an enlarged vertical longitudinal section through one of the stamp applying members.

As best seen in Fig. 10, each of the stamp applying members 67 is provided in its lower end with an upwardly indented recess 68 at the front and rear sides of which are supported horizontal transverse rollers 69 this recess receiving the upper end of a cigarette box 48 when the stamp applying member is in its lowermost position indicated in dotted lines in Fig. 10. It will furthermore be seen by reference to the same figure that the lower end portion of each of the stamp applying members upon the forward and rear sides of its recess 68 are provided with apertures 70 communicating with the interior of the stamp applying member and therefore in communication with the pipe 66 which in turn communicates by a flexible connection 71 with a suction pipe 72, common to all of the stamp applying members of the series, and connected to a suitable air exhausting apparatus for creating a partial vacuum within the stamp applying members at all times. Thus the lower ends of the stamp applying members are adapted to hold the revenue stamp by suction thereagainst as indicated at 73 in Fig. 10, so that when the said members are lowered over the cigarette boxes, the stamps are bent over the upper ends of the box and rolled down upon its side by means of the rollers 69 as particularly shown by the dotted lines in Fig. 10.

Upon each of the pipes 66, as best seen by reference to Fig. 7, is threaded an annularly grooved bearing 74, which, when the cross head 52 is at the limit of its forward movement, engages within one of the conformably shaped recesses 75 in the rear edge of a transverse cross piece 76 secured to the upper ends of uprights 77 vertically slidably disposed in bearings 78 and having their lower ends connected by a cross piece 79 below the table 25 and as particularly seen in Fig. 2, and provided with an intermediate roller indicated in dotted lines at 80 in said figure, traveling within the annular cam groove upon the rear face of a pulley 81, which cam groove is shown in dotted lines at 82, and which pulley 81 is secured upon the driven shaft 40 and is also shown in Fig. 1.

Each of the pipes 66 may also have a spring 83 coiled thereabout between its bearing 74 before mentioned and the upper end of the tubular upright 64 of its casing 63, in order to hold the stamp applying member in elevated position when the bearing 74 is out of engagement with the recess 75.

Figure 6:
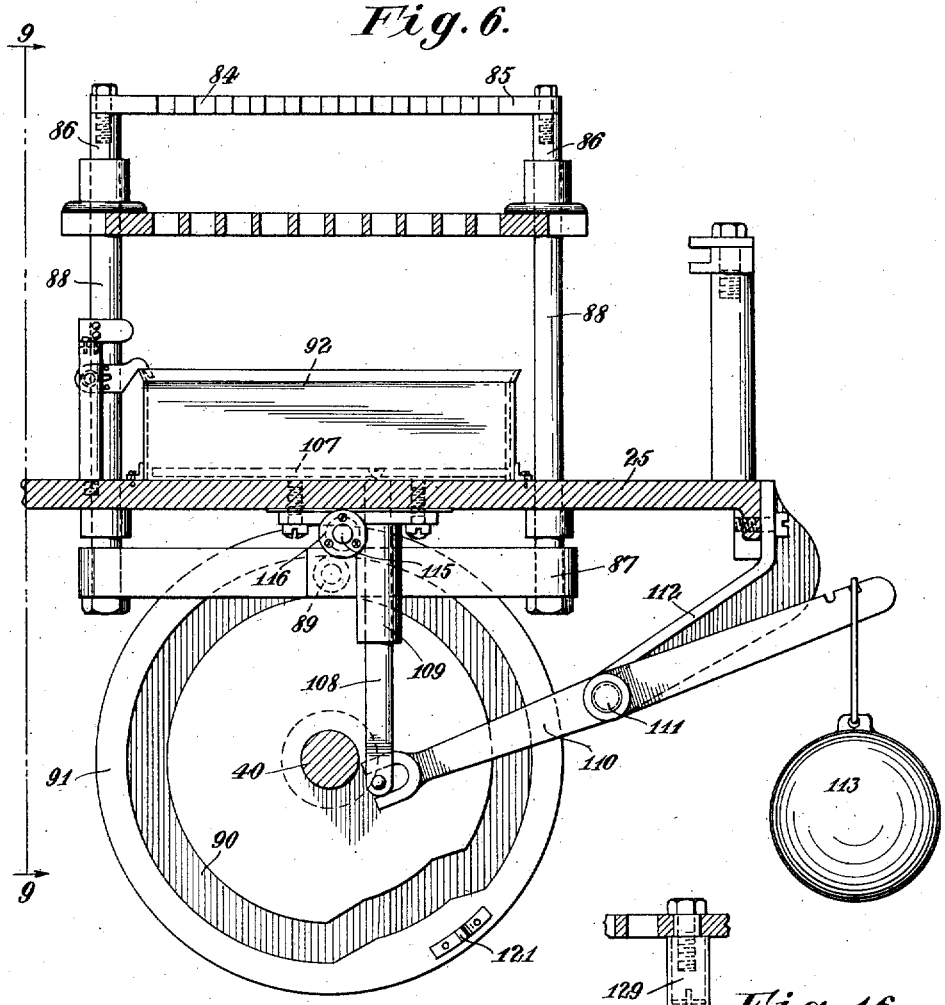
Fig. 6 is a vertical transverse section taken substantially on line 6—6 of Fig. 1.

In the same way the bearings 74 before mentioned, engage within the recesses 75 along the rear edge of the cross strip 76 when the cross head 52 is at the limit of its forward travel; these bearings engage within recesses 84 in the front edge of a cross strip 85 when the cross head 52 is at the rearmost limit of its travel, this cross strip 85 being clearly seen by reference to Figs. 1, 4, 6 and 9, and being secured to the upper end of vertically movable uprights 86, the lower ends of which are connected by a cross strip 87 below the table 25. Furthermore, like the uprights 77, before mentioned, uprights 86 are vertically movable in guides 88 and are raised and lowered by means of a roller 89 carried by the lower cross strip 87 traveling in a cam groove 90 in roller 91 which, as seen in Figs. 1 and 6, is secured upon the driven shaft 40.

Thus when the cross head 52 is at the rearmost limit of its travel the several stamp applying members are again lowered at this point into the upper end of a stamp box 92, disposed upon the table 25 as most clearly seen in Fig. 6, and in which are disposed strips of stamps, ten stamps to each strip, the strips being, of course, in superposed relation and fitting the box, and the stamps of each strip being disposed with their direction of greatest length transverse to the length of the strip itself.

When the stamp applying members of the series are lowered into the stamp box 92 and again raised, a strip of stamps is carried upwardly upon the lower surfaces thereof due to the action of the partial vacuum within the several members and these members with the strip of stamps so held are moved by the action of lever 54 forwardly to the applying position above the cigarette boxes, in the course of which travel a series of equidistantly spaced rotating knives are encountered, these knives being indicated at 93 in Fig. 4, and one thereof being seen in detail in Fig. 5. The several knives 93 are secured upon an arbor 94 having a gear wheel 95 at one end meshing with a gear wheel 96 upon the shaft 97 of the adhesive roller 98 which is disposed in advance of the knife arbor 94 to apply adhesive to the lower surfaces of the several stamps after they are separated from one another by the action of the knives 93.

The adhesive roller 98 has a raised surface corresponding in length to the length of the stamp, and its rotation being timed to move its said raised surface upwardly coincident with the passage of the stamps thereover, so that during rearward movement of the several stamp carriers after the applying operation, there will be no danger of contact between the adhesive roller and the stamp applying members 67 themselves.

To this end the shaft 97 of the adhesive roller 98 is provided, in addition to its gear 96, with a sprocket wheel 100 connected by a sprocket chain 101 as seen in Fig. 1, to a sprocket wheel 102 mounted on a lower transverse shaft 103.

It will be apparent that the stamps connected as they are in strip form when picked up by the several stamp applying members 67, are much closer together than the parts of the several cigarette boxes to which they are to be applied, the latter being disposed with their directions of greatest width transversely of the table 25, and some means must be provided to expand the series of applying members, that is, move the same farther apart at the limit of their forward travel than they assume at the limit of their rearward travel. To this end a guide plate is disposed horizontally above the table and slightly above the horizontal plane of the cross head 52, as particularly seen in Fig. 7, wherein the guide plate is indicated at 104. This guide plate is shown in Fig. 4 partly broken away, and is for the purpose before described provided with a plurality of guide channels 105 having divergent portions as indicated at 106, adjacent their forward ends, whereby to spread the series of stamp applying members from the relatively close formation thereof necessary to pick up a strip of stamps, to the expanded formation coinciding with the series of boxes to which the stamps are to be applied, the transversely sliding movement of the stamp applying members 67 with their casings 63 independent of one another upon the cross strip 60, enabling such movement to be effected, it being understood that the tubular stem 64, before mentioned, of each of the casings 63, extends upwardly through its respective guide channel 105 in which its roller 65, before mentioned, is disposed.

Figure 14:
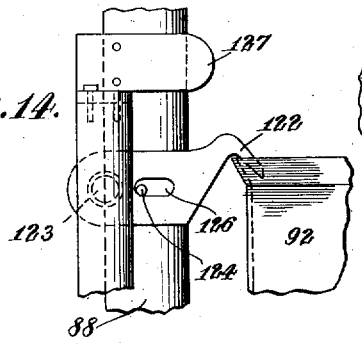
Figure 9:
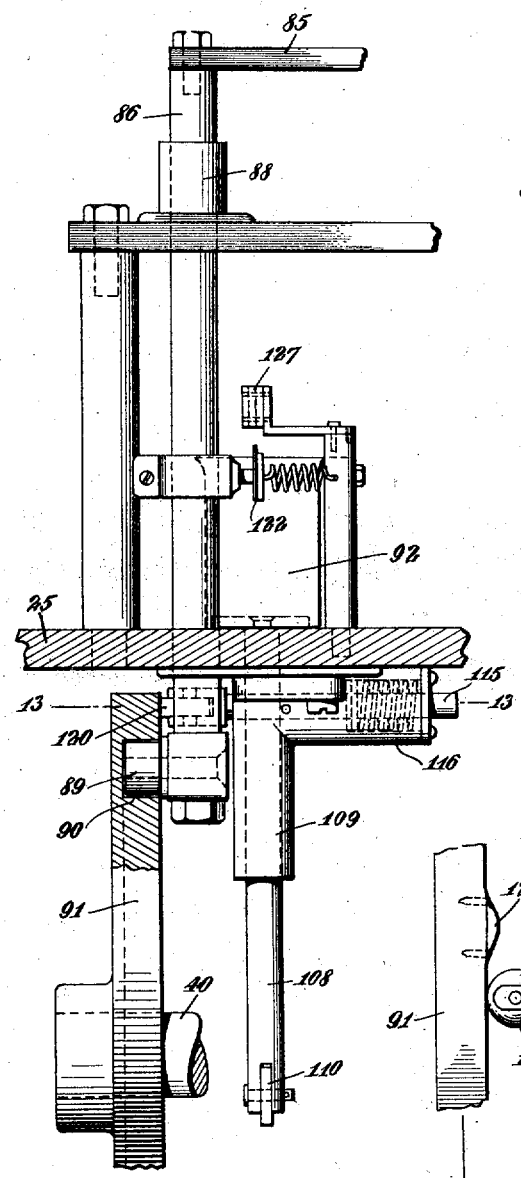
Fig. 9 is a partial vertical transverse section, taken substantially on line 9—9 of Fig. 6.
Figure 13:
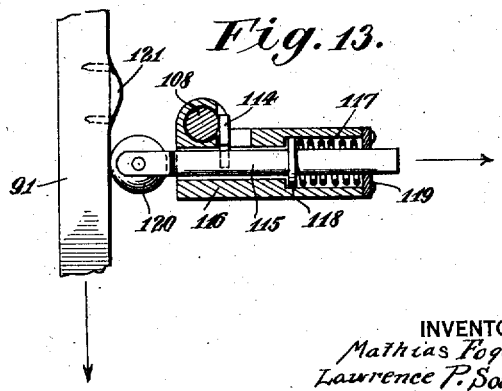
Fig. 13 is a detail horizontal section, taken substantially on line 13—13 of Fig. 8.

Referring again to Fig. 6, it will be noted that the stamp box 92 has a movable base 107 therein, indicated in dotted lines in this figure, and secured to the upper end of an upright 108 having vertical movement in a tubular guide 109, and having connected to its lower end, the inner end of a lever 110 intermediately pivoted at 111 upon a bracket 112 secured to the table 25 and having upon its outer end a counterbalancing weight 113, the action of these parts being to raise the base 107 slightly upon the removal of each strip of stamps in order that the uppermost strip will bear the same relation to the stamp carrier when lowered into the stamp box at all times. The vertically adjustable upright 108 is frictionally gripped and normally held from movement by means of a lateral projection 114 of a longitudinally shiftable locking member 115, which is most clearly seen in Fig. 13, and which locking member works horizontally through a tubular guide 116 having a counterbore in which is disposed a spring 117 coiled around the locking member, and compressed between an annular shoulder 118 of the said locking member and the outer closed end 119 of the tubular guide 116. At its opposite end the locking member 115 has a roller 120 bearing against the grooved face of the cam roller 91 before mentioned, which roller is provided with a cam projection 121 engageable with roller 120 to force the locking member 115 in the direction of its length and against the tension of its spring 117, whereby to withdraw the lateral projection 114 from contact with the upright 108. This action takes place when the stamp applying members are at the limit of their downward movement in their rear position and in contact with the uppermost strip of stamps from the stamp box 92 and permits the counterbalancing weight 113 to force upright 108 vertically and thus lift the stamp box base 107 slightly, the movement being momentary, however, so that the action of spring 117 immediately returns the locking member 115, forcing its lateral projection 114 into frictional engagement with the upright 108, and again locking the parts in the position shown in Fig. 13. As shown in Figs. 6 and 14, the uppermost stamp strip of the series within box 93 is engaged at one end by a sharp-pointed knife 122 when the series of stamp applying members are lowered into the stamp box, in order that when the uppermost strip is raised by the stamp applying members, the stamp knife cutting through the respective end of the sheet, will contact with the next lowermost sheet not so closely held by the stamp applying members, and thus prevent raising of more than a single sheet at a time.

The blade 122 is mounted at its outer end upon a pivot indicated at 123, and is adapted to swing vertically upon this pivot under actuation of a pin 124 extending outwardly from the adjacent movable upright 86, and into a slot 126 lengthwise of the said blade. It will be noted that the width of slot 126 of knife blade 122 is substantially greater than the diameter of the pin 124, as particularly shown in Fig. 14, so that upward movement of the knife blade will not start until the series of stamp applying members have raised sufficiently above the uppermost stamp sheet to enable the foregoing operation of the knife for the purpose of preventing more than a single sheet being raised at a time, to take place. Thereafter, however, during further upward movement of the stamp applying members, the knife blade is swung upwardly and outwardly through the action of pin 124, so as to project its sharpened end between flexible cleaning members 127 by which small adhering particles of the stamp sheet are removed, the point of the knife being maintained in a perfectly clean condition at all times.

Figure 16:
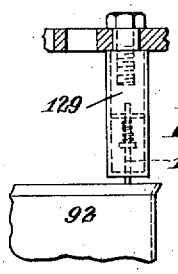
Fig. 16 is a detail of a slightly modified form of the means shown in Fig. 14.

A spring controlled pin, such as indicated in dotted lines at 128 in Fig. 16, may be utilized instead of the knife 122, this pin being mounted within a holder 129, and being for some purposes superior to the knife 122. It will not, for instance need constant cleaning, as will the knife 122, inasmuch as it has been found by experience that no particles of the stamps themselves are likely to adhere to a sharpened pin as they will to a knife, such as before mentioned.

From the foregoing it will be understood that, during each intermittent movement of the steel belt 27 to carry a series of cigarette boxes placed as before described thereon between the flared portions 49 of strips 47, onto the intermediate portion of the table 25 below the cross piece 76, the series of stamp applying members are moved rearwardly to the rear stations and lowered to pick up a stamp sheet, and then after raising, are again moved forwardly to their forward stations, in the course of which movement the stamps are severed from one another and provided with the necessary adhesive by means of the knives 73 and adhesive roller 98 respectively. At the forward position ready for lowering movement to apply the stamps independently held thereby, the stamp applying members are spaced apart a greater distance than at their rear station, as before described, through the action of the guide channels 106 which operate to expand the entire series to points wherein the several stamp applying members are immediately above the centers of the cigarette boxes held in a series, as indicated in broken lines in Fig. 2.

Thus upon lowering movement, each of the stamp applying members carries its stamp as indicated at 73 in Fig. 10, and presses the same downwardly upon the upper end of the cigarette box, as indicated in dotted lines in this figure, each of the stamp applying members being, however, less in width than the stamp carried thereby so as to obviate all danger of the carrying members or their apertures 70 gumming up with the adhesive carried by the stamps themselves.

For this very reason, however, the stamps applied to the boxes are not pressed by the stamp applying members into uniform even contact with the boxes, and thus it is necessary for other means to be provided for this purpose. To this end each series of cigarette boxes to which stamps have been applied, is in the subsequent movement of the steel belt 27, moved beyond the applying station and between spaced parallel series of brushes 130 and 131, respectively mounted upon shafts 132 and 133 journaled at their opposite ends, as best seen in Fig. 2, in the upper ends of supporting arms 134 and 135, the lower angularly and inwardly bent ends of which are journaled upon rotating shafts 136 and 137.

The shaft 137 has a bevel gear 138 at its inner and, as shown in Fig. 4, in mesh with a similar gear 139 of a countershaft 140, the latter connected by a sprocket chain 141 with the main driven shaft 40. Shafts 136 and 137 are connected by intermeshing gears 142 and 143, and are respectively connected to the shafts 132 and 133 by means of sprocket chains 144 and 145, as best seen by reference to Figs. 2 and 8.

The arm 135 at the inner ends of shafts 133 and 137, is provided with a downwardly bent extension 146, as plainly seen in Figs. 1 and 2, supporting a roller 147, traveling within the peripheral cam channel 148, of the cam roller 81, before mentioned, whereby to move the parallel series of rotating brushes 130 and 131 toward and away from one another. The arms 134 and 135 supporting the series of brushes, just mentioned, are, as best seen by reference to Fig. 11, connected by coil springs 149 and are provided with overlapping inner extensions 150 and 151 at their lower inner ends, the extensions 150 of arms 134 overlying the extension 151 of arm 135, so that when the latter are moved outwardly through the action of the extension 146 controlled in its movement by the cam channel 148, extensions 151 will bear upwardly against extensions 150 and thus force the arms 134 outwardly also. The extensions 150 and 151 in their normal position as shown in Fig. 11 rest upon an adjusting screw 152 whereby the inner positions of the rotating brushes may be controlled, so as to press more or less tightly against the boxes.

Each of the series of brushes includes, of course, a brush for each of the cigarette boxes of the series, each brush being substantially greater in width than that of the stamp, so that in their rotation, as shown in Fig. 11, against the sides of the stamp boxes, the stamps will be brushed firmly and evenly in uniform contact with the box throughout, gumming of these brushes 130 and 131 being unimportant.

Having now described our invention, it will be understood that in the several figures, we have shown only a single stamp applying member in order that, in Figs. 2 and 4 in particular, the remaining structure and the several operations may be more readily understood.

It is to be observed, of course, that the several operations take place in properly timed relation, although this timing may, if so desired, be changed within substantially endless limits, as may other details in the construction and operation of the machine, for instance, the number of boxes operated upon at a time, and consequently, the number of stamp applying members and stamp affixing brushes, without departing in any material respect from our invention as outlined.

We claim:

1. In a stamp applying apparatus of the character described, a feed member on which the boxes to be stamped are disposed, stamp applying members for applying stamps to the boxes on the feed member, rotating brushes between which the boxes carried by the feed member travel, for brushing the applied stamps into uniform contact with the boxes, shafts upon which said brushes are secured, supporting arms fulcrumed adjacent their lower ends and in the upper portions of which said shafts are journaled, driving connections for the feed member including a main shaft, and a cam wheel carried by said shaft, one of said supporting arms having an extension co-acting with the cam whereby to rock the arms in alternately opposite directions and thus move said brush shafts with their brushes toward and away from one another.

2. In a stamp applying apparatus of the character described, a feed member on which the boxes to be stamped are disposed, stamp applying members for applying stamps to the boxes on the feed member, rotating brushes between which the boxes carried by the feed member travel, for brushing the applied stamps into uniform contact with the boxes, shafts upon which said brushes are secured, supporting arms fulcrumed adjacent their lower ends and in the upper portions of which said shafts are journaled, driving connections for the feed member including a main shaft, and a cam wheel carried by said shaft, one of said supporting arms having an extension co-acting with the cam whereby to rock the arms in alternately opposite directions and thus move said brush shafts with their brushes toward and away from one another, said supporting arms having inwardly projecting lapping extensions whereby movement of one arm will cause movement of both arms.

3. In a stamp applying apparatus of the character described, a series of stamp applying members horizontally movable toward and away from the boxes to be stamped, a carrier for said members, and means for moving said members toward and away from one another on said carrier.

4. In a stamp applying apparatus of the character described, a series of stamp applying members, a carrier movable rectilinearly in a horizontal direction and supporting said members, means for moving said members vertically with respect to said carrier, and means for moving said members toward and away from one another.

5. In a stamp applying apparatus of the character described, a series of stamp applying members, a carrier movable rectilinearly in a horizontal direction and supporting said members, means to move said members toward and away from one another during their movement with the carrier, and means for moving said members vertically with respect to said carrier, said last named means engaging said members at the limits of their travel with the said carrier.

6. In a stamp applying apparatus of the character described, a series of stamp applying members, a horizontally movable carrier supporting said members, and means for moving said members laterally toward and away from one another with respect to said carrier.

7. In a stamp applying apparatus of the character described, a series of stamp applying members, a horizontally movable carrier supporting said members, and means for moving said members laterally toward and away from one another, with respect to said carrier, said last named means acting upon the said stamp applying members during their horizontal movement with the said carrier.

8. In a stamp applying apparatus of the character described, a series of stamp applying members, a horizontally movable carrier supporting said members, a guide for moving said members toward and away from one another during their movement with the carrier, and vertically movable members engageable with said applying members at the limits of their horizontal movement, for moving the same in a vertical direction.

9. In a stamp applying apparatus of the character described, a series of stamp applying members, a horizontally movable carrier supporting said members, and a stationary guide plate having channels in which portions of said members slide, in their movement with the carrier, said channels having angular portions whereby to move the members laterally toward and away from one another during their horizontal movement.

10. In a stamp applying apparatus of the character described, a series of stamp applying members, a horizontally movable carrier supporting said members, means for moving said members laterally toward and away from one another during their horizontal movement, and means for moving the said applying members vertically at the limits of their horizontal movement.

11. In a stamp applying apparatus of the character described, a series of horizontally movable stamp applying members and means for expanding the series of members in their movement in one direction, and contracting the same in their movement in the opposite direction.

12. In a stamp applying apparatus of the character described, a stamp holder, supporting means for a series of boxes to be stamped, and a series of stamp applying members movable horizontally between, and in a plane above, the said stamp holder and the said boxes, and stamp cutting and adhesive applying means located between the said stamp holder and the said boxes to be stamped, for action upon the stamps during the movement of said applying members from the stamp holder to the said boxes.

13. In a stamp applying apparatus of the character described, a series of stamp applying members, each of which comprises a lower hollow head having a box receiving cavity in its lower end, and having its lower wall perforated upon opposite sides of said cavity, and an upright hollow stem, the lower end of which is in communication with the interior of said head, and a suction pipe with which the upper end of said stem is connected for the purpose described.

14. In a stamp applying apparatus of the character described, a series of stamp applying members each of which includes a lower hollow head having its lower wall provided with a box receiving cavity and with perforations upon opposite sides of said cavity, and a hollow upright stem the lower end of which is in communication with the interior of said head, stamp pressing rollers mounted within and at the sides of the said box receiving cavity of the head, and a suction pipe with which the upper end of said stem is connected for the purpose described.

15. In a stamp applying apparatus of the character described a series of stamp applying members having suction means for engaging and holding stamps in position for application to boxes to be stamped, a stamp holder for strips of stamps into which the said members are movable in a vertical line to pick up the stamps by the said suction means, a stamp engaging member having a sharpened engaged end extending into the said holder, and downwardly into contact with the upper surface of the uppermost stamp at one side of the latter, whereby to provide for its passage through the uppermost stamp and its engagement with the next lowermost stamp when the former is raised by the suction means.

16. In a stamp applying apparatus of the character described, a series of stamp applying members having suction means for engaging and holding stamps in position for application to boxes to be stamped, a stamp holder for strips of stamps into which the said members are movable in a vertical line to pick up the stamps by the said suction means, and a stamp engaging member extending into the said holder and having a sharpened end engaging the upper surface of the uppermost stamp strip, to pass through the same and into engagement with the next lowermost stamp when the former is lifted, whereby to prevent the withdrawal of the next lowermost stamp strip, the said stamp holder including a box having a vertically adjustable base, and means to yieldingly maintain the uppermost stamp strip in engagement with the said engaging member.

17. In a stamp affixing machine, means for holding an unconnected strip of stamps, means for simultaneously severing the strip between each pair of adjacent stamps to form a plurality of unconnected stamps, and means for affixing said stamps.

18. In a stamp affixing machine, means for severing an unconnected strip of stamps between each adjacent pair of stamps to form a plurality of unconnected stamps, and means operative both to hold the strip during severing and to affix the stamps.

19. In a stamp affixing machine, a plurality of stamp carrying members adapted to engage simultaneously an unconnected strip of stamps, means for severing the strip between stamps to form a plurality of unconnected stamps, and means for affixing the stamps.

20. In a stamp affixing machine, a plurality of stamp carrying members adapted to engage simultaneously an unconnected strip of stamps, means for severing the strip between stamps to form a plurality of unconnected stamps, and means for affixing the stamps.

21. In a stamp affixing machine, a plurality of stamp carrying members adapted to engage simultaneously an unconnected strip of stamps, means for simultaneously severing the strip between each pair of adjacent stamps to form a plurality of unconnected stamps, and means for affixing the stamps.

22. In a stamp affixing machine, a stamp supplying means, a stamp carrying member traveling from and toward the stamp supply in the same path; means rotated about a fixed axis for rendering the stamp adhesive, operable during the travel of said member away from said stamp supply, and means for holding said adhesive rendering means out of operative position during the return of said member toward the stamp supply.

23. In a stamping machine, the combination of means for concurrently severing the connections between stamps joined in unconnected strips to form a plurality of unconnected stamps, and means for subjecting a strip of stamps to the concurrent operations of the severing means and applying the unconnected stamps of the resulting series respectively to articles of a corresponding series.

24. In a stamping machine, the combination of means for severing a strip of connected stamps into a series of disconnected stamps, means for applying adhesive to such stamps, and means for subjecting the strip to the operation of said severing means, and subjecting the stamps of the resulting series contemporaneously to the operation of said adhesive applying means.

25. In a stamping machine, the combination of means for severing a strip of connected stamps into a series of disconnected stamps, means for applying adhesive to such stamps and means for subjecting the strip to the operation of said severing means, subjecting the stamps of the resulting series contemporaneously to the operation of said adhesive applying means and applying the stamps respectively to a corresponding series of articles.

26. In a stamping machine, the combination of means for severing a strip of connected stamps into a series of disconnected stamps, means for applying adhesive to such stamps and means for subjecting the strip of stamps to the operation of said severing means, subjecting the stamps to the operation of said adhesive applying means and applying the stamps simultaneously to respective articles of a corresponding series.

27. In a stamping machine, the combination of means for concurrently severing the connections between stamps joined in strips, means for applying adhesive to such stamps and means for subjecting a strip of stamps to the concurrent operations of said severing means and subjecting the stamps of the resulting series contemporaneously to the operation of said adhesive applying means.

28. In a stamping machine, the combination of means for concurrently severing the connections between stamps joined in unconnected strips to form a plurality of unconnected stamps and means for subjecting a strip of stamps to the concurrent operations of said severing means and for applying the unconnected stamps of the resulting series simultaneously to respective articles of a corresponding series.

29. In a stamping machine, the combination of means for concurrently severing the connections between stamps joined in strips, means for applying adhesive to such stamps, and means for subjecting a strip of stamps to the concurrent operations of said severing means, subjecting the stamps contemporaneously to the operation of said adhesive applying means and applying the stamps simultaneously to respective articles of a corresponding series.

30. In a machine for applying stamps originally joined in strips to articles of greater width than the individual stamps, the combination of means for severing such strips into series of disconnected stamps and means to subject a strip of stamps to the operation of said severing means, properly space the stamps of the resulting series and apply the spaced stamps to respective articles of a corresponding series.

31. In a machine for applying stamps originally joined in strips to articles of greater width than the individual stamps, the combination of means for severing such strips into series of disconnected stamps, means for placing a corresponding series of such articles in position to be stamped and means to subject a strip to the operation of said severing means, properly space the stamps of the resulting series and apply the spaced stamps respectively to the positioned articles of the corresponding series.

32. In a stamp applying machine, the combination of an adhesive applying roller having a raised portion on its periphery, a stamp carrier, means for causing the stamp carrier to pass and repass said roller and means for so turning said roller that the said raised portion moves into proximity to the carrier as it passes and remains out of proximity to the carrier as it repasses said roller.

33. A stamp applying device, including a body portion having stamp engaging members provided with suction apertures, said members being spaced apart by a distance slightly greater than the transverse dimension of a predetermined article to which the stamp is to be applied, forming an aperture between said members of sufficient depth to withdraw the ends of the stamp from suction engagement by said members when the article is forced against the stamp and into the aperture.

34. A stamp applying device having an article receiving gap adapted to be bridged by a stamp, pressing means located in said gap, said device having suction perforations flanking said gap and so located as to be covered by outer portions of said stamp when its intermediate portion overlies said gap, whereby when the stamp is pushed into said gap its outer portions will be withdrawn from over said perforations and passed over said pressing means.

35. In a stamp affixing machine, means for supplying strips of stamps, a holder for a plurality of articles to be stamped, a plurality of stamp carrying members traveling between the supply and the holder, means for simultaneously engaging all of said members with a strip of stamps, means for moving the stamp carrying members in parallel paths toward the holder, means for serving the strip between each pair of adjacent stamps, operating during the parallel movement of said members, means for thereafter moving said members in diverging paths to position said members properly relative to the articles, and means for affixing the stamps thereto.

36. In a stamp affixing machine, a stamp affixing head having spaced portions adapted to engage a stamp adjacent its ends by suction, being open between said spaced portions to form an article receiving cavity, and guide means for maintaining said stamp in transverse flat condition when an article is forced against the stamp and into the cavity.

37. In a stamp affixing machine, a stamp engaging head having spaced stamp engaging means, being open between said engaging means to form an article receiving cavity, and rollers mounted in the sides of said cavity and bearing against the stamp during the passage of an article into said cavity.

38. In a stamp affixing machine, a stamp affixing head having a hollow body connected to suction means, perforations through one side thereof adjacent opposite edges of said side, adapted to hold a stamp by suction, said body being cut away to form a package receiveing space between said perforations, and guide means for maintaining said stamp in transverse flat condition when an article is forced against the stamp and into the cavity.

39. In a stamp affixing machine, a movable carriage, stamp affixing means carried thereby and slidable thereon in a direction transverse to the line of travel thereof, and means operable during the movement of the carriage to shift the stamp affixing means on said carriage.

40. In a stamp affixing machine, a stamp carrying member, a carriage carrying said member and movable from stamp engaging position to stamp depositing position, and means for shifting said member along the carriage during the motion of said carriage.

41. In a stamp affixing machine, a movable carriage, a housing engaing and slidable along said carriage, a stamp affixing head carried by said housing, a rod attached to the head and extending through said housing, and means engaging the rod for moving said head within the housing toward and away from the carriage.

42. In a stamp affixing machine, a pair of separate spaced reciprocating members, a stamp carrier normally disconnected from both of said members and traveling between them, and means for the engagement of said stamp carrier by each reciprocating member at the respective limits of its travel, so that the reciprocation of said members will move the carrier into operative position.

43. In a stamp-affixing machine, a plurality of stamp affixing heads, means for reciprocating said heads along a fixed path and for presenting said heads simultaneously in alinement at the ends of said path, a unitary transverse member located adjacent one end of the path adapted to engage said heads simultaneously to move them into position to engage stamps, and a unitary transverse member located adjacent the other end of the path adapted to engage said heads simultaneously and actuate them to deposit stamps carried thereby.

44. In a stamp-affixing machine, a plurality of stamp affixing heads, means for reciprocating said heads along a fixed path and for presenting said heads simultaneously in alinement at the ends of said path, a unitary transverse member located adjacent one end of the path adapted to engage said heads simultaneously, means for reciprocating said member and the heads engaged thereby to move said heads into position to engage stamps, and a unitary transverse member located adjacent the other end of the path adapted to engage said heads simultaneously, and means for reciprocating said last-mentioned member to shift said heads into position to deposit the stamps carried thereby.

45. In a stamp affixing machine, a plurality of stamp affixing members movable toward and from each other, means for holding said members in close relation for engaging stamps, means for shifting said members from the stamp engaging position to stamp affixing position, and means operable during the action of said shifting means for moving the members away from each other to properly position said members relative to articles to be stamped.

46. In a stamp affixing machine, a plurality of stamp carrying members shiftable toward and from the articles to be stamped, means for varying the distance between said members during such shift, and means for affixing the stamps.

47. In a stamp affixing machine, means for supplying stamps, a plurality of stamp carrying members shiftable from said supply toward the articles to be stamped, means for varying the distance between said members during such shift, and means for affixing the stamps.

48. In a stamp affixing machine, an intermittent feed, means for simultaneously attaching a plurality of stamps transversely to the line of feed upon articles carried by said feed at an attaching station, oppositely located stamp pressing devices positioned at each side of the feed at a smoothing station spaced along the line of feed from the attaching station, means for swinging said devices outwardly away from the line of feed during its feeding motion, means for swinging said devices inwardly into simultaneous contact with stamps carried by a plurality of articles during the halt of the feed, and means for moving said devices over the surfaces of said stamps to smooth them, while the articles are stationary, into engagement with said articles.

In testimony whereof we have hereunto set our hands.

MATHIAS FOGDE.
LAWRENCE P. SOUTHWICK.